(12) United States Patent
Nakashima et al.

(10) Patent No.: US 8,331,805 B2
(45) Date of Patent: Dec. 11, 2012

(54) DIGITAL COHERENT OPTICAL RECEIVER

(75) Inventors: Hisao Nakashima, Kawasaki (JP); Takeshi Hoshida, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 396 days.

(21) Appl. No.: 12/776,514

(22) Filed: May 10, 2010

(65) Prior Publication Data

US 2010/0303474 A1 Dec. 2, 2010

(30) Foreign Application Priority Data

May 29, 2009 (JP) .................................. 2009-131343

(51) Int. Cl.
H04B 10/06 (2006.01)
(52) U.S. Cl. ....................................... 398/208; 398/203
(58) Field of Classification Search .................. 398/203, 398/208
See application file for complete search history.

(56) References Cited

U.S. PATENT DOCUMENTS

| 6,917,031 | B1 | 7/2005 | Sun et al. | |
|---|---|---|---|---|
| 7,280,619 | B2 * | 10/2007 | Nemer et al. | 375/323 |
| 2008/0267638 | A1 * | 10/2008 | Nakashima et al. | 398/208 |

FOREIGN PATENT DOCUMENTS

EP 1 986 352 A2 10/2008

OTHER PUBLICATIONS

Yiran Ma et al., "Bandwidth-Efficient 21.4 Gb/s Coherent Optical 2A 2 Mimo OFDM Transmission", Optical Fiber Communication/National Fiber OPTIC Engineers Conference, Feb. 24, 2008, pp. 1-3.

Petrou C S et al., "Impact of transmitter and receiver imperfections on the performance of coherent optical QPSK communication systems" IEEE Lasers and Electro-Optics Society, Nov. 9, 2008, pp. 410-411.
Fatadin I et al, "Compensation of Quadrature Imbalance in an Optical QPSK Coherent Receiver", IEEE Photonics Technology Letters, IEEE Service Center, Piscataway, NJ, US LNKD-DOI:10.1109/LPT, vol. 20, No. 20, Oct. 15, 2008, pp. 1733-1735.
Shinji Yamashita, et al.,"Double-Stage Phase-Diversity (DSPD) Scheme for Coherent Optical Fiber Communications-Optical Circuit Imbalance and its Compensation", Electronics & Communications in Japan, Part 1-Communications, Wiley, Hoboken, NJ, US, vol. 74, No. 8, Aug. 1, 1991, pp. 50-60.
European Search Report dated Sep. 6, 2010 and issued in corresponding European Patent Application 10162121.7.
Dany-Sebastien Ly-Gagnon et al., "Coherent Detection of Optical Quadrature Phase-Shift Keying Signals With Carrier Phase Estimation," IEEE, Journal of Lightwave Technology, vol. 24, No. 1, Jan. 2006, pp. 12-21.
Fred Harris, "Digital Filter Equalization of Analog Gain and Phase Mismatch in I-Q Receivers," Tiernan Communications, Inc., Sep. 29, 1996, pp. 793-796.

* cited by examiner

Primary Examiner — Shi K Li
(74) Attorney, Agent, or Firm — Staas & Halsey LLP

(57) ABSTRACT

A digital coherent optical receiver provided with a 90-degree optical hybrid circuit for detecting an in-phase signal and a quadrature signal of an input optical signal, includes first through fourth circuits. The first circuit calculates a square of a sum of the in-phase signal and the quadrature signal. The second circuit subtracts a squared value of the in-phase signal and a squared value of the quadrature signal from the calculation result of the first circuit. The third circuit detects a phase error of the 90-degree optical hybrid circuit based on the calculation result of the second circuit. The fourth circuit corrects at least one of the in-phase signal and the quadrature signal according to the phase error detected by the third circuit.

10 Claims, 11 Drawing Sheets

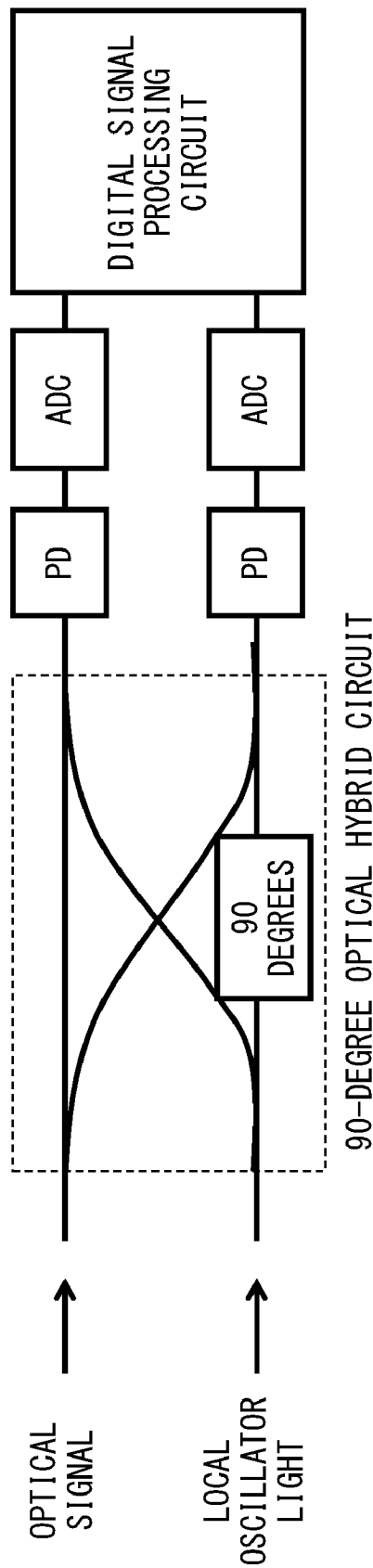
F I G. 1

DIGITAL COHERENT OPTICAL RECEIVER

CROSS-REFERENCE TO RELATED APPLICATIONS

This application is based upon and claims the benefit of priority of the prior Japanese Patent Application No. 2009-131343, filed on May 29, 2009, the entire contents of which are incorporated herein by reference.

FIELD

The present invention relates to a digital coherent optical receiver.

BACKGROUND

Large-capacity optical communication systems have been promoted along with the spread of the Internet. For example, for a trunk line system, an optical transmitter and an optical receiver capable of transmitting signals with 40 Gbit/s or more per wavelength are studied.

When a bit rate per wavelength is increased, an optical signal to noise ratio (OSNR) tolerance is degraded and the deterioration of signal quality due to waveform distortion caused by the chromatic distribution, polarization mode distribution, non-linear effect of the transmission line, and the like increases. Therefore, a digital coherent receiver with high OSNR tolerance and high waveform distortion tolerance has been focused on recently.

In the digital coherent receiving method, optical amplitude information and phase information is extracted from a received signal and the received signal is demodulated by a digital signal processing circuit. In the digital coherent receiving method, since OSNR tolerance is improved by coherent reception and waveform distortion is compensated for by a digital signal processing circuit, even an optical communication system with 40 Gbit/s or more obtains a high reliability. A method for receiving optical QPSK signals by coherent detection is described, for example, by D. Ly-Gagnon et al., "Coherent Detection of Optical Quadrature Phase-Shift Keying Signals With Carrier Phase Estimation", IEEE, Journal of Lightwave Technology, vol. 24, No. 1, pp. 12-21, January 2006.

FIG. 1 illustrates a configuration of a digital coherent optical receiver. In FIG. 1, a 90-degree optical hybrid circuit includes first and second input ports and first and second output ports. An optical signal and local oscillator light are input to the first and second input ports, respectively. The local oscillator light is generated by a laser light source provided for a receiver. The optical signal and the local oscillator light are mixed and output from the first output port. The 90-degree optical hybrid circuit includes a 90-degree phase shift element. The optical signal and the local oscillator light whose phase is shifted by 90 degrees are mixed and are output from the second output port. One set of optical signals output from the first and second output ports are converted into electrical signals by respective photo detectors. Then the electrical signals are converted into digital signals by respective A/D converters and are given to the digital signal processing circuit.

One set of digital signals given to the digital signal processing circuit indicate a real part component and a imaginary part component in the case where an input optical signal is expressed by a complex electric field. Then, the digital signal processing circuit demodulates the input optical signal using this set of digital signals.

When the 90-degree phase shift element has a phase error (quadrature error or quadrature angle error) in the digital coherent optical receiver having the above configuration, crosstalk is caused between the real part signal and the imaginary part signal. In this case, the demodulation performance of the digital coherent optical receiver deteriorates. In particular, in a modulation method whose spectral usage efficiency is high (that is, MPSK, MQAM and the like in which the number of transmitted bits per symbol is large), since quality deterioration is sensitive to the phase error of the 90-degree phase shift element, a technique for compensating for the phase error is required.

As a method for compensating for the phase error of the 90-degree optical hybrid circuit, the following procedure is proposed. A method is provided for correcting a quadrature angle error that exists in the coherent receiver hardware of a dual-polarization optical transport system. The receiver hardware that causes the quadrature angle error is a 90 degree optical hybrid mixing device. The method involves generating an estimate of the quadrature angle error and compensating for the quadrature angle error by multiplying the first and second detected baseband signals by coefficients that are a function of the estimate of the quadrature angle error. (for example, U.S. Pat. No. 6,917,031)

However, when the above method is realized by a hardware circuit, the circuit scale increases. When the calculation speed of a processor is taken into account, it is difficult to realize the above method by software in a receiver for receiving Gbit/s signals.

SUMMARY

According to an aspect of an invention, a digital coherent optical receiver provided with a 90-degree optical hybrid circuit for detecting an in-phase signal and a quadrature signal of an input optical signal includes first through fourth circuits. The first circuit calculates a square of a sum of the in-phase signal and the quadrature signal. The second circuit subtracts a squared value of the in-phase signal and a squared value of the quadrature signal from the calculation result of the first circuit. The third circuit detects a phase error of the 90-degree optical hybrid circuit based on the calculation result of the second circuit. The fourth circuit corrects at least one of the in-phase signal and the quadrature signal according to the phase error detected by the third circuit.

According to another aspect of an invention, a digital coherent optical receiver provided with a 90-degree optical hybrid circuit for detecting an in-phase signal and a quadrature signal of an input optical signal includes an amplitude error compensation circuit and first through fourth circuits. The amplitude error compensation circuit generates a second in-phase signal by correcting the in-phase signal in such a way that amplitude information about the in-phase signal coincides with a target value and generate a second quadrature signal by correcting the quadrature signal in such a way that amplitude information about the quadrature signal coincides with the target value. The first circuit calculates a square of a sum of the second in-phase signal and the second quadrature signal. The second circuit subtracts a squared value of the second in-phase signal and a squared value of the second quadrature signal from the calculation result of the first circuit. The third circuit detects a phase error of the 90-degree optical hybrid circuit based on the calculation result of the second circuit. The fourth circuit corrects at least one of the second in-phase signal and the second quadrature signal according to the phase error detected by the third circuit.

According to another aspect of an invention, a digital coherent optical receiver provided with a 90-degree optical hybrid circuit for detecting an in-phase signal and a quadrature signal of an input optical signal includes a phase error compensation circuit to generate a first signal and a second signal, which represent the in-phase signal and the quadrature signal whose phase error of the 90-degree optical hybrid circuit is compensated for, according to the in-phase signal and the quadrature signal. The phase error compensation circuit includes first through fourth circuits. The first calculation circuit calculates a square of a sum of the first signal and the second signal. The second circuit subtracts a squared value of the first signal and a squared value of the second signal from the calculation result of the first circuit. The third circuit detects the phase error of the 90-degree optical hybrid circuit based on the calculation result of the second circuit. The fourth circuit generates the first signal and the second signal by correcting at least one of the in-phase signal and the quadrature signal according to the phase error detected by the third circuit.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 1 illustrates a configuration of a digital coherent optical receiver.

DESCRIPTION OF EMBODIMENTS

Figure 2:
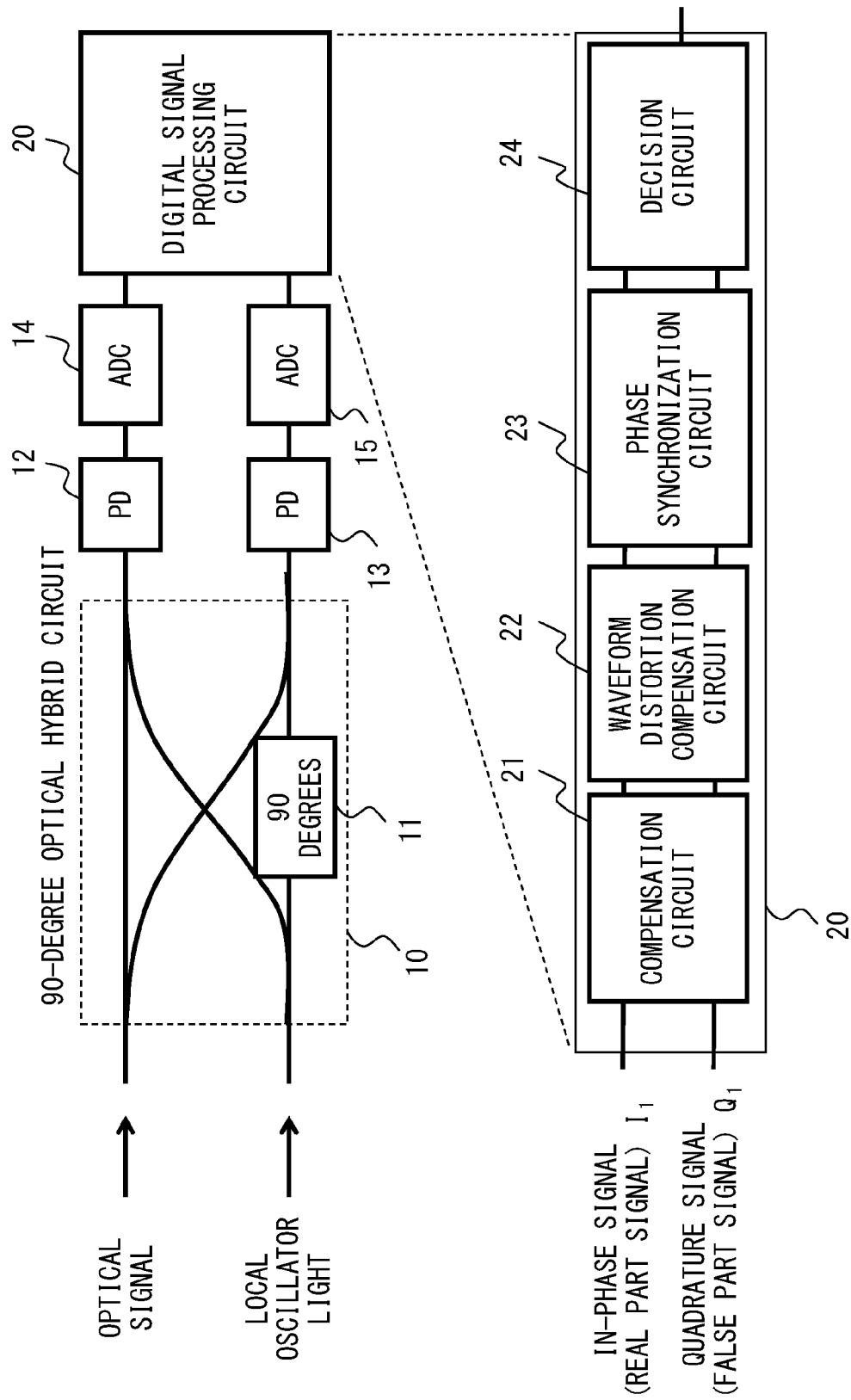
FIG. 2 illustrates a configuration of the digital coherent optical receiver in the embodiment.

FIG. 2 illustrates a configuration of the digital coherent optical receiver in the embodiment. The digital coherent optical receiver in the embodiment includes a 90-degree optical hybrid circuit 10, photo detectors 12 and 13, A/D converters 14 and 15, and a digital signal processing circuit 20.

The 90-degree optical hybrid circuit 10 includes first and second input ports and first and second output ports. An optical signal and local oscillator light are input to the first and second input ports, respectively. In this embodiment, the optical signal is transmitted from an optical transmitter, which is not illustrated, via an optical fiber transmission path and is received by the digital coherent optical receiver. The local oscillator light is generated by a laser light source, which is not illustrated, provided for the digital coherent optical receiver. The optical signal and local oscillator light are mixed in, for example, an optical waveguide and the resultant lightwave is guided to the first output port as an in-phase signal. The 90-degree optical hybrid circuit 10 includes a 90-degree phase shift element 11 for shifting the phase of local oscillator light by 90 degrees. The 90-degree phase shift element 11 may adjust the optical path length of the optical waveguide according to an applied voltage. The optical signal and the local oscillator light whose phase is shifted by 90 degrees are mixed and output from the second output port as a quadrature signal.

One set of optical signals (the in-phase signal and the quadrature signal) output from the first and second output ports are converted into electrical signals by photo detectors (PD) 12 and 13, respectively. For the photo detectors 12 and 13, for example, photodiodes are used. The A/D converters 14 and 15 convert one set of the electrical signals obtained by the photo detectors 12 and 13, respectively, into digital signals and give the set of digital signals to the digital signal processing circuit 20. In this case, when the optical signal is expressed by a complex electric field, the set of digital signals correspond to the real and imaginary part components of the input optical signal. Also in this case, the real and imaginary part components correspond to the in-phase (I) and quadrature (Q) components of the optical signal. Therefore, the set of digital signals given to the digital signal processing circuit 20 are sometimes called "real part component" and "imaginary part component" below. Note that, in general, in-phase and quadrature signals are related to real and imaginary part signals, respectively, however, in-phase and quadrature signals may also be related to real and imaginary part signals, respectively.

The digital signal processing circuit 20 includes a compensation circuit 21, a waveform distortion compensation circuit 22, a phase synchronization circuit 23, and a decision circuit 24. The compensation circuit 21 compensates for phase error and amplitude error. The phase error corresponds to the error (quadrature error) of the 90-degree phase shift element 11. The amplitude error indicates the imbalance in the average amplitude between the real part signal and the imaginary part signal.

The waveform distortion compensation circuit 22 compensates for waveform distortion caused in a transmission line. The waveform distortion is caused, for example, by chromatic distribution, polarization mode distribution, and the like. Namely, the waveform distortion compensation circuit 22 compensates for chromatic distribution, polarization mode distribution, and the like. The phase synchronization circuit 23 establishes phase synchronization. The establishment of phase synchronization includes a process for compensating for the frequency and phase error of carrier wave light for propagating the optical signal and the local oscillator light. The decision circuit 24 recovers data from the real part signal and the imaginary part signal for each symbol. Specifically, the input optical signal is demodulated and the transmission data is recovered. In the QPSK system, for example, two bits of transmission data are recovered based on the real and imaginary part signals for each symbol.

FIG. 2 illustrates a digital coherent receiver without a polarization diversity configuration. However, the configuration illustrated in FIG. 2 may be applied to a polarization diversity receiver. The polarization diversity receiver has a polarization beam splitter and a pair of digital coherent receivers. The polarization beam splitter generates a pair of orthogonally polarized signals of the input signal. The pair of digital coherent receivers recover data from the pair of orthogonally polarized signals, respectively. In this case, each of the digital coherent receivers of the polarization diversity receiver may be realized by the receiver illustrated in FIG. 2. Note that a digital coherent receiver without a polarization diversity configuration will be taken as an example and explained below.

Figure 3:
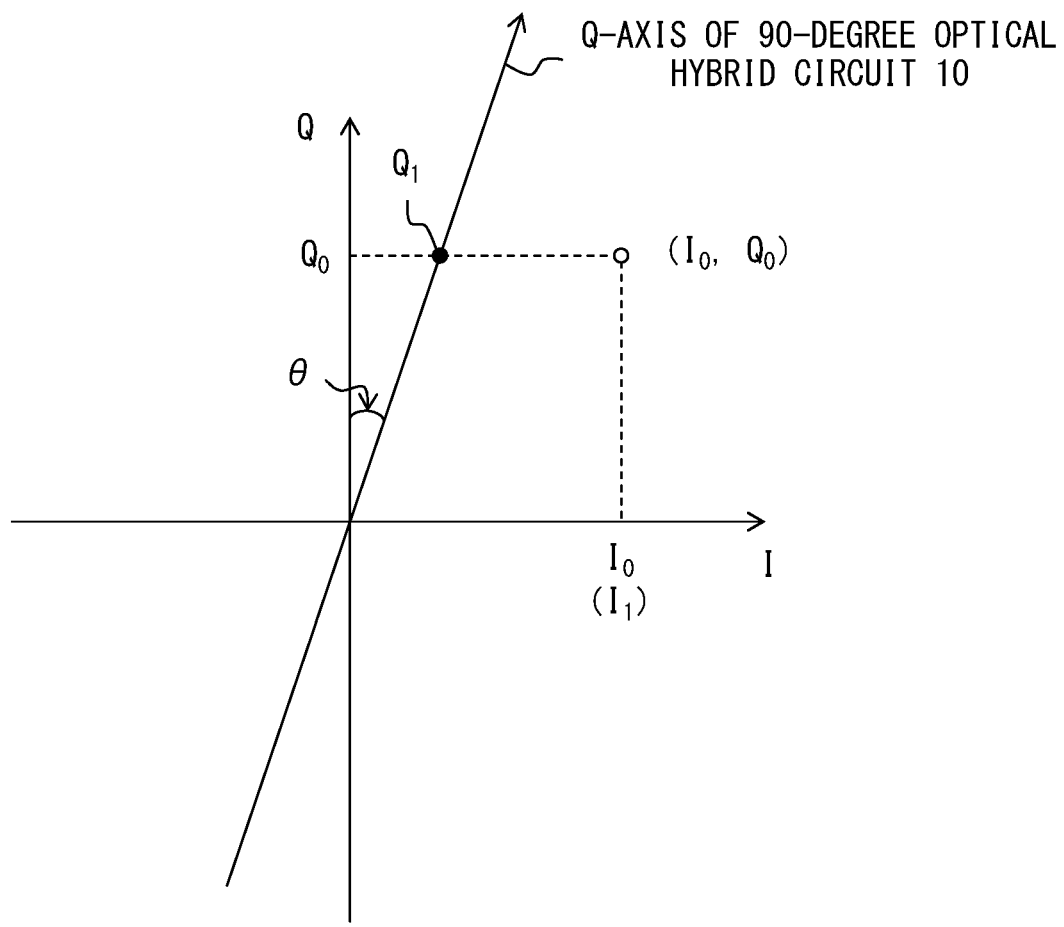
FIG. 3 explains a phase error and an amplitude error.

FIG. 3 explains a phase error and an amplitude error. In this case, it is assumed that the real and imaginary components of a certain symbol are expressed by $(I_0, Q_0)$. In addition, it is assumed that the phase of the 90-degree phase shift element 11 is exactly set to 90 degrees and that there is no amplitude imbalance. The real and imaginary components to be input to the digital signal processing circuit 20 are $I_0$ and $Q_0$, respectively.

However, it is not easy to precisely adjust the phase of the 90-degree phase shift element 11 to 90 degrees. The phase of the 90-degree phase shift element 11 changes depending on temperature, aging deterioration, or the like. Therefore, in FIG. 3, the phase of the 90-degree phase shift element 11 has an error θ with respect to "quadrature angle". This error is sometimes called "phase error" or "quadrature error".

In this case, the real and imaginary part signals $I_1$ and $Q_1$, respectively, input to the digital processing circuit 20 are expressed by the following expression. α represents the imbalance in amplitude between the real and imaginary part signals.

$$I_1 = I_0$$

$$Q_1 = \alpha(I_0 \sin\theta + Q_0 \cos\theta)$$

Namely, the input signal of the digital signal processing circuit 20 is expressed according to expression (1).

$$\begin{bmatrix} I_1 \\ Q_1 \end{bmatrix} = \begin{bmatrix} 1 & 0 \\ \alpha\sin(\theta) & \alpha\cos(\theta) \end{bmatrix} \begin{bmatrix} I_0 \\ Q_0 \end{bmatrix} \quad (1)$$

When the 90-degree optical hybrid circuit 10 has a phase error θ, crosstalk occurs between the real and imaginary part signals. In this case, a demodulation performance deteriorates. Therefore, the digital coherent optical receiver in the embodiment includes the compensation circuit 21 to compensate for the phase error θ (and amplitude imbalance α) caused in the 90-degree optical hybrid circuit 10.

The digital signal processing circuit 20 may be realized by a hardware circuit or by using a processor for executing a software program. However, in order to process several tens of Gbit/s signals, it is preferable that the digital signal processing circuit 20 be realized by a hardware circuit that can calculate at high speed. In this case, the hardware circuit may be realized as an ASIC.

First Embodiment

Figure 4:
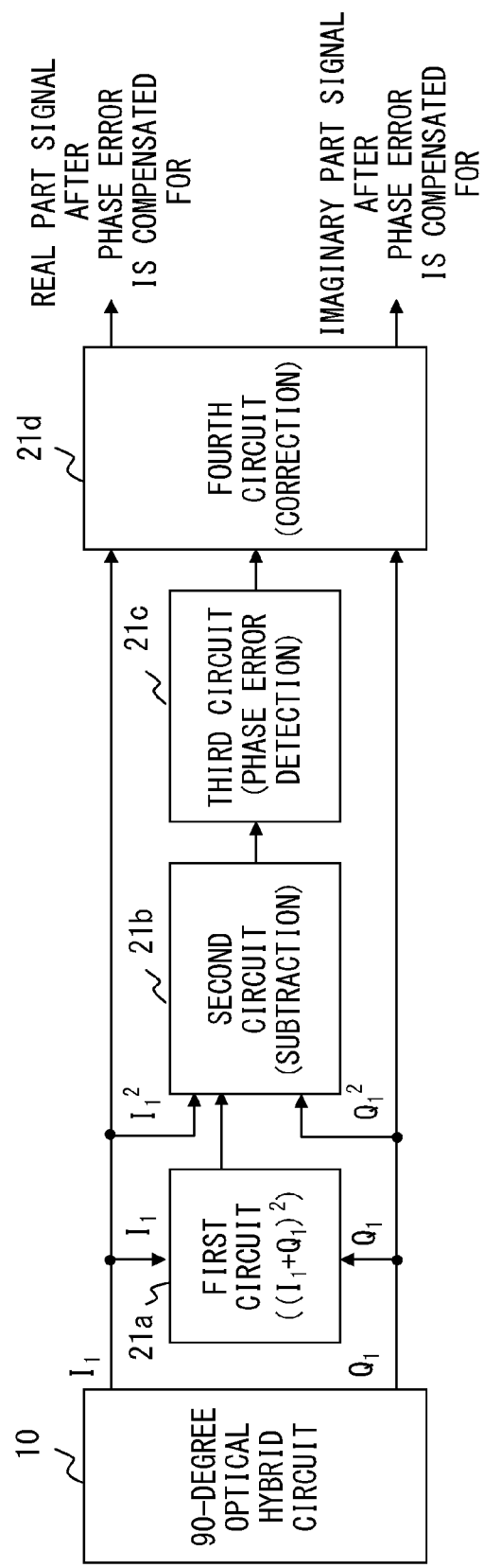
FIG. 4 illustrates a configuration of the digital coherent optical receiver in the first embodiment.

FIG. 4 illustrates a configuration of the digital coherent optical receiver in the first embodiment. FIG. 4 describes the 90-degree optical hybrid circuit 10 and compensation circuit 21 that are illustrated in FIG. 2. In FIG. 4, the photo detectors (PD) 12 and 13, and A/D converters 14 and 15 that are illustrated in FIG. 2 are omitted.

The digital coherent optical receiver in the first embodiment includes first through fourth circuits 21a-21d. As explained with reference to FIGS. 2 and 3, the 90-degree optical hybrid circuit 10 generates the real part signal $I_1$ and the imaginary part signal $Q_1$ for respectively representing the real and imaginary components of an input optical signal. In the following description it is assumed that the in-phase and quadrature signals of the input optical signal are related to the real and imaginary components, respectively, in a complex electric field. The first through fourth circuits 21a-21d may be realized by the digital signal processing circuit.

The first circuit 21a calculates the square of the sum of the real and imaginary part signals. Specifically, $(I_1+Q_1)^2$ is obtained by the first circuit 21a. The second circuit 21b subtracts the squared value of the real part signal and the squared value of the imaginary part signal from the calculation result of the first circuit 21a. Specifically, $(I_1+Q_1)^2-(I_1^2+Q_1^2)$ is calculated by the second circuit 21b. In this case, the second circuit may calculate the sum $(I_1^2+Q_1^2)$ of the squared value of the real part signal and the squared value of the imaginary part signal, and then subtract the sum from the calculation result of the first circuit 21a. Alternatively, the second circuit 21b may individually subtract $I_1^2$ and $Q_1^2$ from the calculation result of the first circuit 21a. $2I_1Q_1$ is obtained by the second circuit 21b by calculating according to one of the procedures. The third circuit 21c detects the phase error of the 90-degree optical hybrid circuit 10, using the calculation result of the second circuit 21b. Then, the fourth circuit 21d corrects at least one of the real part signals $I_1$ and the imaginary part signal $Q_1$ according to the phase error detected by the third circuit 21c.

In this case, crosstalk between the real and imaginary part signals in the case where the 90-degree optical hybrid circuit 10 has a phase error θ depends on the calculation result of the second circuit 21b. Therefore, the phase error of the 90-degree optical hybrid circuit 10 is compensated for by correcting the real part signal $I_1$ and the imaginary part signal $Q_1$ using the calculation result of the second circuit 21b.

The first circuit 21a may individually receive $I_1$ and $Q_1$ to calculate $(I_1+Q_1)^2$ or may receive the sum $I_1+Q_1$ to calculate $(I_1+Q_1)^2$. The fourth circuit 21d may correct the real and imaginary part signals by either feed-forward or feedback system. Furthermore, the digital coherent optical receiver in the first embodiment may further include a circuit for compensating for an amplitude error.

Second Embodiment

Figure 5:
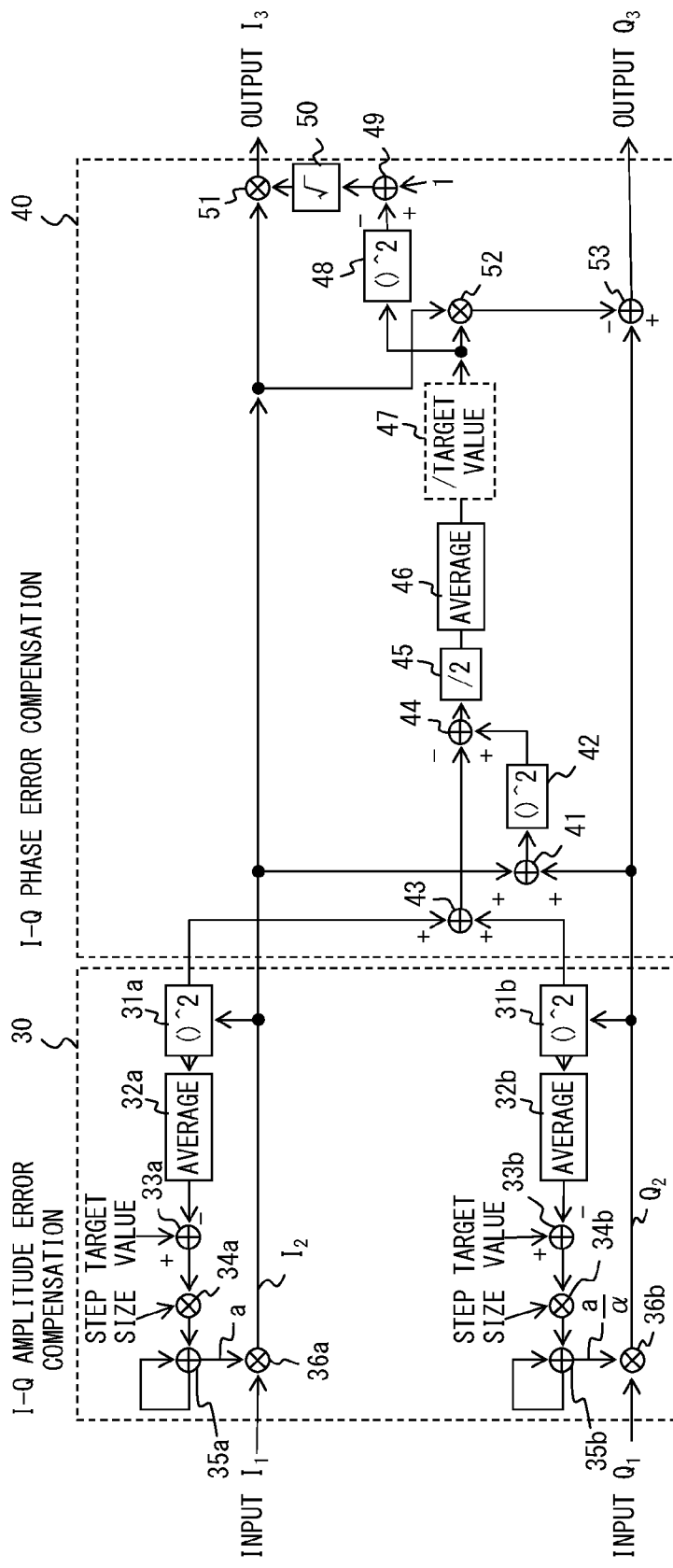
FIG. 5 illustrates a configuration of the digital coherent optical receiver in the second embodiment.

FIG. 5 illustrates a configuration of the digital coherent optical receiver in the second embodiment. The digital coherent optical receiver in the second embodiment includes an I-Q amplitude error compensation circuit 30 and an I-Q phase error compensation circuit 40. In the second embodiment, the I-Q phase error compensation circuit 40 compensates for an I-Q phase error by a feed-forward method. It is assumed that the real part signal $I_1$ and the imaginary part signal $Q_1$ illustrated in the above expression (1) are input to the digital coherent optical receiver for each symbol. Each of $I_1$ and $Q_1$ are a predetermined number of bits of digital data.

The I-Q amplitude error compensation circuit 30 includes a squaring circuit 31a, an averaging circuit 32a, a differential circuit 33a, a multiplier 34a, an accumulation adder 35a, and a multiplier 36a in order to correct the real part signal $I_1$. In the following description, a signal output from the multiplier 36a is called $I_2$.

The squaring circuit 31a squares the signal $I_2$. The averaging circuit 32a averages the signal $I_2^2$ output from the squaring circuit 31a. At this moment, the averaging circuit 32a calculates the average of the output signals of the squaring circuit 31a for a plurality of symbols (for example, several symbols through several tens of symbols). The differential circuit 33a calculates a difference between the output signal of the averaging circuit 32a and a target value. The calculation result of the differential circuit 33a is output as an error signal. The target value is, for example, 1 or $2^N$ (N is an integer), though the embodiment is not limited to this value.

The multiplier 34a multiplies the error signal obtained by the differential circuit 33a by a specified constant. This constant is a step size for determining the response speed of a control loop and is sufficiently small. The accumulation adder 35a calculates the accumulation value of the calculation result of the multiplier 34a. Specifically, the accumulation adder 35a operates as an integrator. Then, the multiplier 36a generates the signal $I_2$ by multiplying the real part signal $I_1$ by the calculation result of the accumulation adder 35a.

In this case, the mean square of the real part signal $I_1$ (that is, the average of $I_1^2$) is basically constant. For example, in a QPSK system, since four signal points $(1, 1), (1, -1), (-1, -1)$ and $(-1, 1)$ are used, the mean square of the input real part signal $I_1$ is 1. Here, the output signal of the accumulation adder 35a is constant, as described later. Thus, the signal $I_2$, which is obtained by multiplying the input real part signal $I_1$ by the output signal of the accumulation adder 35a, is also a constant. Accordingly, the output signal of the averaging circuit 32a is almost constant.

The above feedback system operates in such away that the output signal of the differential circuit 33a may become zero. Specifically, the output signal of the averaging circuit 32a coincides with the target value. As a result, the output signal of the accumulation adder 35a converges on a certain value. This value is referred to a "normalization coefficient a". Thus, the I-Q amplitude error compensation circuit 30 generates the signal $I_2$ by multiplying the real part signal $I_1$ by the normalization coefficient a.

The I-Q amplitude error compensation circuit 30 further includes a squaring circuit 31b, an averaging circuit 32b, a differential circuit 33b, a multiplier 34b, an accumulation adder 35b, and a multiplier 36b in order to correct the imaginary part signal $Q_1$. The configurations and operations of the squaring circuit 31b, the averaging circuit 32b, the differential circuit 33b, the multiplier 34b, the accumulation adder 35b, and the multiplier 36b are basically the same as those of the squaring circuit 31a, the averaging circuit 32a, the differential circuit 33a, the multiplier 34a, the accumulation adder 35a, and the multiplier 36a, respectively.

Specifically, this feedback system (31b-36b) operates in such a way that the output signal $Q_2^2$ of the averaging circuit 32b coincides with the target value. In this case, this target value is the same as the target value used in order to correct the real part signal. However, in this embodiment, real and imaginary part signals may have the amplitude imbalance α. Therefore, the output signal of the accumulation adder 35b converges on a/α. Accordingly, the I-Q amplitude error compensation circuit 30 generates the signal $Q_2$ by multiplying the imaginary part signal $Q_1$ by the coefficient a/α.

The signals $I_2$ and $Q_2$ obtained by the I-Q amplitude error compensation circuit 30 are given to the I-Q phase error compensation circuit 40. At this time, the I-Q amplitude error of the signals $I_2$ and $Q_2$ has been compensated for and both of the amplitude of the signals $I_2$ and $Q_2$ has been normalized. The signal process by the I-Q amplitude error compensation circuit 30 is expressed by expression (2).

$$\begin{bmatrix} I_2 \\ Q_2 \end{bmatrix} = a \begin{bmatrix} 1 & 0 \\ 0 & 1/\alpha \end{bmatrix} \begin{bmatrix} 1 & 0 \\ \alpha\sin(\theta) & \alpha\cos(\theta) \end{bmatrix} \begin{bmatrix} I_0 \\ Q_0 \end{bmatrix} \quad (2)$$

$$= a \begin{bmatrix} 1 & 0 \\ \sin(\theta) & \cos(\theta) \end{bmatrix} \begin{bmatrix} I_0 \\ Q_0 \end{bmatrix}$$

Not only the signals $I_2$ and $Q_2$ but also the output signals of the squaring circuits 31a and 31b are given to the I-Q phase error compensation circuit 40. In this case, the output signals of the squaring circuits 31a and 31b are $I_2^2$ and $Q_2^2$, respectively.

The I-Q phase error compensation circuit 40 includes an adder 41, a squaring circuit 42, an adder 43, a subtractor 44, a divider 45, an averaging circuit 46, a divider 47, a squaring circuit 48, a subtractor 49, a square root calculator 50, a multiplier 51, a multiplier 52, and a subtractor 53.

The adder 41 calculates the sum of signals $I_2$ and $Q_2$. Specifically, $I_2+Q_2$ is calculated. The squaring circuit 42 squares the output signal of the adder 41. Specifically, $(I_2+Q_2)^2$ is calculated. The adder 43 calculates the sum of signals $I_2^2$ and $Q_2^2$. Specifically, $I_2^2+Q_2^2$ is calculated. The subtractor 44 subtracts the output signal of the adder 43 from the output signal of the squaring circuit 42. The divider 45 divides the output signal of the subtractor 44 by "2". Then, the averaging circuit 46 averages the output signals of the divider 45. In this case, the averaging circuit 46 calculates the average value of the output signals of the divider 45 for a plurality of symbols (for example, several through several tens of symbols).

The output signal of the averaging circuit 46 is expressed by the following expression (3). In the above expression, "N" is the number of symbols used by the averaging circuit 46.

$$\Sigma\{\{(I_2+Q_2)^2-(I_2^2+Q_2^2)\}/2\}/N \quad (3)$$

When expression (3) is developed, expression (4) can be obtained.

$$\sum \{\{(I_2 + Q_2)^2 - (I_2^2 + Q_2^2)\}/2\}/N = \quad (4)$$
$$\sum \{\{(I_2^2 + 2I_2Q_2 + Q_2^2) - (I_2^2 + Q_2^2)\}/2\}/N =$$
$$\sum \{2I_2Q_2/2\}/N = \sum \{I_2Q_2\}/N$$

In the above expression, $I_2$ and $Q_2$ may be expressed by the above expression (2). Therefore, the output signal of the averaging circuit 46 is expressed by the following expression (5).

$$\sum \{I_2Q_2\} = \sum \{(aI_0)(aI_0\sin\theta + aQ_0\cos\theta)\} \quad (5)$$
$$= \sum \{a^2I_0(I_0\sin\theta + Q_0\cos\theta)\}$$
$$= \sum \{a^2(I_0^2\sin\theta + I_0Q_0\cos\theta)\}$$

In this case, it is assumed that data propagated by the optical signal is a random bit string. If so, there is no correlation between $I_0$ and $Q_0$. Therefore, $\Sigma I_0Q_0$ becomes zero. Accordingly, in this case, the output signal of the averaging circuit 46 may be expressed by the following expression (6).

$$\sin\theta\Sigma\{a^2I_0^2\}/N \quad (6)$$

The divider 47 divides the output signal of the averaging circuit 46 by a target value. This target value is the same as that used in the I-Q amplitude error compensation circuit 30. In this case, in the feedback system of the I-Q amplitude error compensation circuit 30, the averaging circuit 32a calculates the average of the square of the signal $I_2$ and it is controlled in such a way that the output signal of the averaging circuit 32a may coincide with the target value. Therefore, this target value may be expressed by $\Sigma\{a^2 I_0^2\}/N$.

If so, the output of the divider 47 is expressed by the following expression (7).

$$\{\sin\theta \sum \{a^2 I_0^2\}/N\}/\text{target value} = \{\sin\theta \sum \{a^2 I_0^2\}/N\}/ \qquad (7)$$
$$= \{\sum \{a^2 I_0^2\}/N$$
$$= \sin\theta$$

In the above expression, $\theta$ is the phase error of the 90-degree optical hybrid circuit 10. Specifically, in the second embodiment, the phase error of the 90-degree optical hybrid circuit 10 is detected by the output signal of the divider 47.

The squaring circuit 48 squares the output signal of the divider 47. Specifically, $\sin_2 \theta$ is calculated by the squaring circuit 48. The subtractor 49 calculates $1-\sin_2 \theta$ by subtracting the output signal of the squaring circuit 48 from "1". The square root calculator 50 calculates the square root of the output signal of the subtractor 49. As a result, $\cos \theta$ is obtained. Furthermore, the multiplier 51 multiplies the signal $I_2$ by the output signal of the square root calculator 50. Specifically, $I_2 \cos \theta$ is calculated. Then, the calculation result of the multiplier 51 is output as a signal $I_3$.

In this case, the signal $I_2$ is $aI_0$ as expressed by expression (2). Therefore, the signal $I_3$ is expressed by the following expression (8).

$$\text{Signal } I_3 = I_2 \cos \theta = a I_0 \cos \theta \qquad (8)$$

The multiplier 52 multiplies the signal $I_2$ by the output signal of the divider 47. Specifically, $I_2 \sin \theta$ is calculated. The subtractor 53 subtracts the output signal of the multiplier 52 from the signal $Q_2$. Then, the calculation result of the subtractor 53 is output as a signal $Q_3$. In this case, the signal $Q_2$ is a $(I_0 \sin \theta + Q_0 \cos \theta)$, as represented by expression (2). Therefore, the signal $Q_3$ is expressed by expression (9).

$$\text{Signal } Q_3 = Q_2 - I_2 \sin \theta \qquad (9)$$
$$= a(I_0 \sin \theta + Q_0 \cos \theta) - a I_0 \sin \theta$$
$$= a Q_0 \cos \theta$$

When the above expressions (8) and (9) are expressed in a matrix form, expression (10) is obtained.

$$\begin{bmatrix} I_3 \\ Q_3 \end{bmatrix} = \begin{bmatrix} \cos(\theta) & 0 \\ -\sin(\theta) & 1 \end{bmatrix} a \begin{bmatrix} 1 & 0 \\ \sin(\theta) & \cos(\theta) \end{bmatrix} \begin{bmatrix} I_0 \\ Q_0 \end{bmatrix} = a\cos(\theta) \begin{bmatrix} I_0 \\ Q_0 \end{bmatrix} \qquad (10)$$

Thus, the output signals $I_3$ and $Q_3$ of the I-Q phase error compensation circuit 40 is expressed by the following expressions.

$$I_3 = a I_0 \cos \theta$$

$$Q_3 = a Q_0 \cos \theta$$

In this case, the signal $I_3$ does not include the $Q_0$ component. Similarly, the signal $Q_3$ does not include the $I_0$ component. Therefore, neither the signal $I_3$ nor $Q_3$ includes a crosstalk component. "a $\cos \theta$" is common to the signals $I_3$ and $Q_3$. Therefore, the original real and imaginary components $I_0$ and $Q_0$ of the optical signal are obtained based on the signals $I_3$ and $Q_3$. In this case, "a" and "$\cos \theta$" do not change in a short time. Specifically, $I_3:Q_3=I_0:Q_0$. Therefore, for example, when the optical signal carries data using phase modulation, such as QPSK or the like, the modulation phase of each symbol may be precisely calculated according to a ratio between the signals $I_3$ and $Q_3$. In addition, when the optical signal carries data using QAM or the like, the modulation phase and amplitude of each symbol may be precisely calculated using $I_3$, $Q_3$ and $$I_3^2 + Q_3^2.$$

Thus, according to the digital coherent optical receiver in the second embodiment, the phase error of the 90-degree optical hybrid circuit is compensated for and the original real and imaginary components $I_0$ and $Q_0$ of an input optical signal are obtained. Therefore, the demodulation performance is improved.

In the embodiment illustrated in FIG. 5, the I-Q phase error compensation circuit 40 includes two dividers 45 and 47. In this case, when the divider is realized by a hardware circuit, generally the circuit scale increases. However, the function of the divider 45 is to divide the output signal of the subtractor 44 by "2". Therefore, the divider 45 is realized by a bit shift circuit. The circuit size of the bit shift circuit is generally small.

The divider 47 divides the output signal of the averaging circuit 46 by a target value. This target value is a constant used in the control system of the I-Q amplitude error compensation circuit 30 and a desired value may be selected. In this embodiment, the target value is, for example, "1". In this case, the divider 47 divides the output signal of the averaging circuit 46 by "1". Therefore, in this case, the I-Q phase error compensation circuit 40 may be configured without the divider 47. In this case, the phase error of the 90-degree optical hybrid circuit 10 is detected by the output signal of the averaging circuit 46. The above target value may also be, for example, "$2^N$". In this case, the divider 47 may be realized by a bit shift circuit. Thus, if an appropriate value is selected as the target value, the divider 47 may be deleted or the circuit scale of the divider 47 may be reduced.

The I-Q phase error compensation circuit 40 uses $I_2^2$ and $Q_2^2$ in order to compensate for phase error. However, $I_2^2$ and $Q_2^2$ are calculated by the I-Q amplitude compensation circuit 30. Then, the I-Q phase error compensation circuit 40 compensates for phase error using the $I_2^2$ and $Q_2^2$ that are calculated by the I-Q amplitude compensation circuit 30. In this configuration, since the I-Q phase error compensation circuit 40 dose not need to include respective circuits for squaring the signals $I_2$ and $Q_2$, the circuit scale of the I-Q phase error compensation circuit 40 may be reduced.

Furthermore, the I-Q phase error compensation circuit 40 calculates $I_2 Q_2$ using the adder 41, the squaring circuit 42, the adder 43, and the subtractor 44 without using multipliers. In this case, the circuit scales of an adder, a squaring circuit, and a subtractor are smaller than a multiplier. Therefore, the circuit scale of the I-Q phase error compensation circuit 40 may be reduced. The I-Q phase error compensation circuit 40 may individually subtract $I_1^2$ and $Q_1^2$ from $(I_2+Q_2)^2$ without including the adder 43.

In the embodiment illustrated in FIG. 5, after an amplitude imbalance is compensated for by the I-Q amplitude compensation circuit 30, the I-Q phase error compensation circuit 40 compensates for a phase error. However, the second embodiment is not limited to this configuration. In other words, in the second embodiment, after the I-Q phase error compensation circuit 40 compensates for a phase error, an amplitude error may be compensated for.

Variation 1 of Second Embodiment

In the embodiment illustrated in FIG. 5, a feedback system is configured in such a way that the respective averages of $I_2^2$ and $Q_2^2$ may coincide with their target values in the I-Q amplitude compensation circuit 30. However, the feedback system may operate in such a way that the respective averages of the absolute values of the signals $I_2$ and $Q_2$ may coincide with the corresponding target value. In this case, the I-Q amplitude compensation circuit 30 includes a circuit for calculating the absolute value of an input signal instead of the squaring circuits 31a and 31b.

The absolute values of real/imaginary part signals correspond to the "amplitude" of signals representing the real/imaginary components of an optical signal. The squared value of real/imaginary part signals are the square of their amplitude. Therefore, both the absolute values and the squared values of real/imaginary part signals are "amplitude information" about signals representing real/imaginary components of the optical signal.

Variation 2 of Second Embodiment

In the embodiment illustrated in FIG. 5, the I-Q amplitude compensation circuit 30 compensates for amplitude errors by feedback control. However, the I-Q amplitude compensation circuit 30 may compensate for amplitude errors by feed-forward control.

Figure 6:
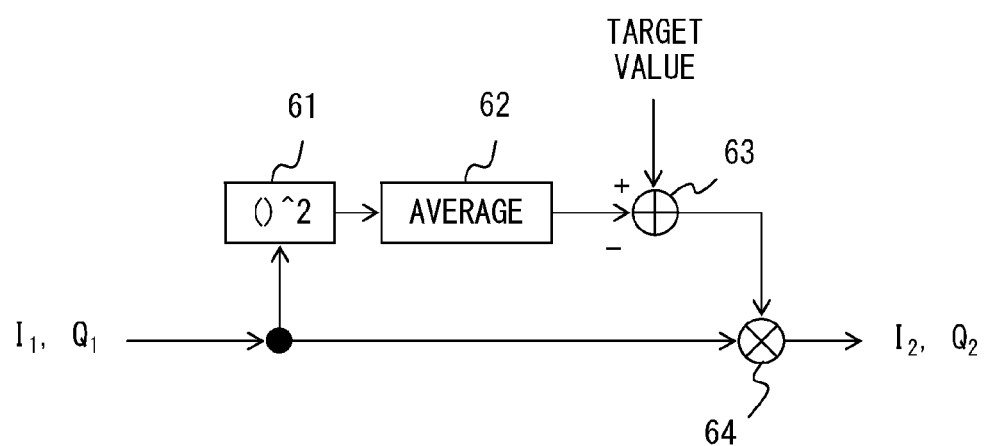
FIG. 6 illustrates a feed-forward system for compensating for amplitude error.

FIG. 6 is a feed-forward system for compensating for amplitude error. The feed-forward system is provided in order to correct respective real and imaginary part signals. These feed-forward systems in a circuit for correcting the real part signal and in a circuit for the imaginary part signal are the same. This forward system includes a squaring circuit 61, an averaging circuit 62, a subtractor 63 and a multiplier 64.

In the circuit for correcting the real part signal, the squaring circuit 61 squares the signal $I_1$. The averaging circuit 62 averages the output signal of the squaring circuit 61. The subtractor 63 calculates a difference between the target value and the output signal of the averaging circuit 62. Then, multiplier 64 generates the signal $I_2$ by multiplying the signal $I_1$ by the above difference. In the circuit for correcting the imaginary part signal, the signal $Q_2$ is generated from the signal $Q_1$ in the similar way. In the feed-forward system illustrated in FIG. 6, the absolute values of signals $I_1$ and $Q_1$ may be used instead of the square of signals $I_1$ and $Q_1$.

Variation 3 of Second Embodiment

The digital coherent optical receiver illustrated in FIG. 5 includes the I-Q amplitude compensation circuit 30 and the I-Q phase error compensation circuit 40. However, the digital coherent optical receiver illustrated in FIG. 7 does not include the I-Q amplitude compensation circuit 30. In other words, the digital coherent optical receiver illustrated in FIG. 7 may be used, for example, when received optical signal has no or small I-Q amplitude error (for example, when $\alpha \cong 1$ in the expression 1).

In this configuration, the digital coherent optical receiver includes the I-Q phase error compensation circuit 40 illustrated in FIG. 5. The configuration and operation of the I-Q phase error compensation circuit 40 are basically as explained with reference to FIG. 5.

However, in this configuration, $I_1$, $Q_1$, $I_1^2$ and $Q_1^2$ are input for each symbol. The adder 41, the squaring circuit 42, the adder 43, the subtractor 44, the divider 45, and the averaging circuit 46 perform the same calculations as in the configuration illustrated in FIG. 5 to these input signals. In this case it is assumed that an I-Q amplitude error does not exist or is small and that "$\alpha=1$" in expression (1). If so, the output signal of the averaging circuit 46 is expressed by $\Sigma I_0^2 \sin \theta / N$.

The divider 47 calculates $\tau I_1^2$ and further divides the output signal of the averaging circuit 46 by $\Sigma I_1^2/N$. In this case, $\Sigma I_1^2/N$ is the average of the square of the signal $I_1$. A circuit for calculating the average of the square of the signal $I_1$ may be realized, for example, by the same circuit as the squaring circuit 31a and averaging circuit 32a illustrated in FIG. 5. Alternatively, $\Sigma I_1^2/N$ may be calculated by averaging $I_1^2$ for each symbol.

The output signal of the divider 47 is expressed by the following expression.

$(\Sigma I_0^2 \sin \theta / N)/(\Sigma I_1^2/N) = \Sigma I_0^2 \sin \theta / \Sigma I_1^2 = \sin \theta$ A configuration for correcting the real and imaginary part signals using the output signal of the divider 47 (that is, $\sin \theta$) is basically the same as the configuration illustrated in FIG. 5. A $\cos \theta$ calculation circuit 54 calculates $\cos \theta$ based on $\sin \theta$. In this case, the $\cos \theta$ calculation circuit 54 may be realized by the squaring circuit 48, the subtractor 49, and the square root calculator 50 illustrated in FIG. 5 or by another circuit configuration.

Variation 4 of Second Embodiment

A digital coherent optical receiver generally has a function to monitor the amplitude or power of an input optical signal and to detect whether there is an optical signal. In the configuration illustrated in FIG. 8, the phase error of real/imaginary part signals is compensated for by using the information detected by this monitor function.

Figure 8:
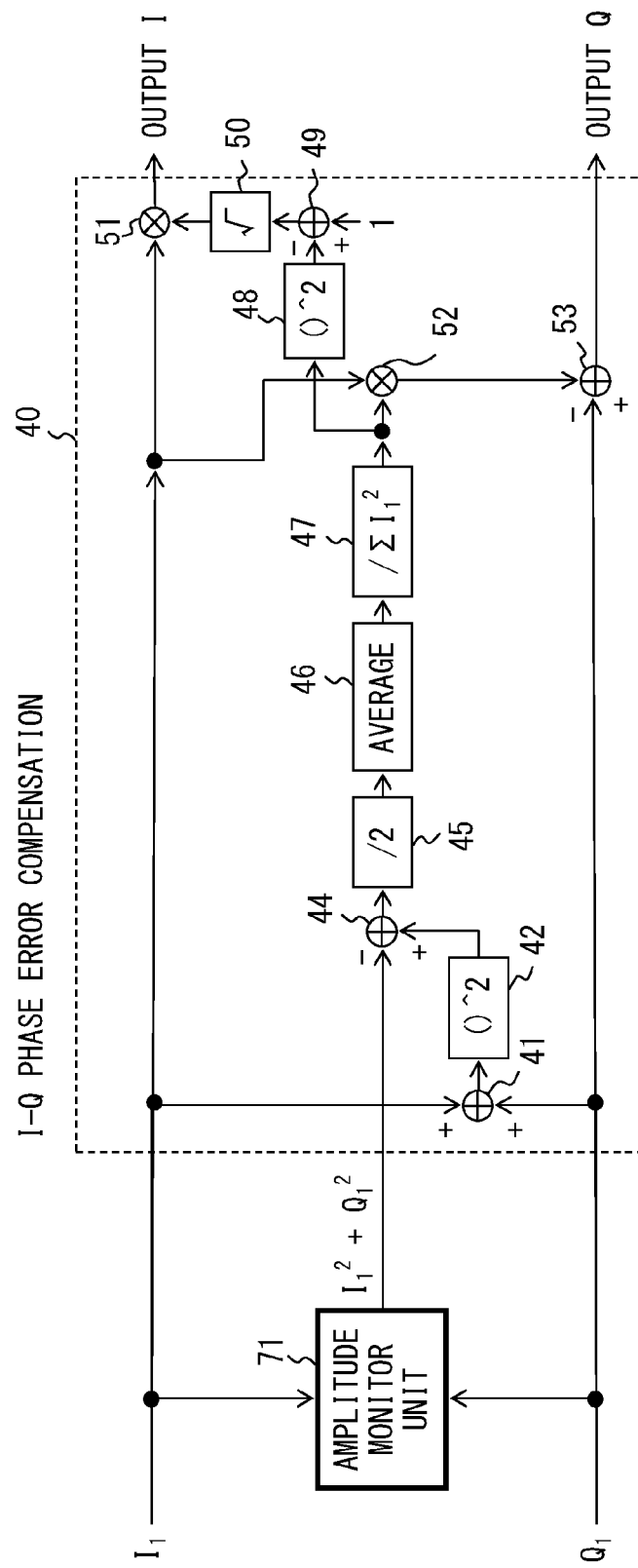
FIG. 8 illustrates a variation (configuration provided with an amplitude monitor unit) of the digital coherent optical receiver in the second embodiment.

The digital coherent optical receiver illustrated in FIG. 8 includes an amplitude monitor unit 71. The amplitude monitor unit 71 receives the signals $I_1$ and $Q_1$ and calculates amplitude information $I_1^2+Q_1^2$. The amplitude information is transmitted to a detector for detecting whether there is an optical signal, which is not illustrated, and also given to the I-Q phase error compensation circuit 40.

Figure 7:
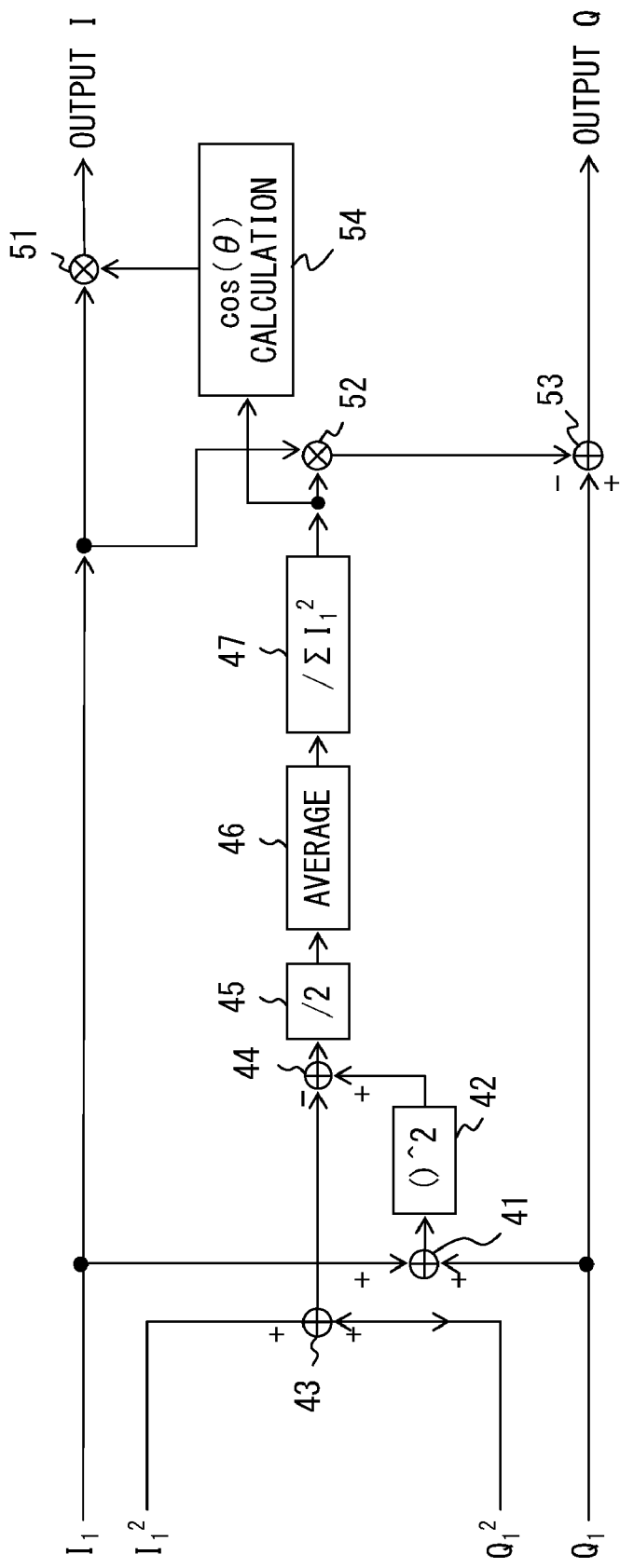
FIG. 7 illustrates a variation (configuration without an amplitude error compensation circuit) of the digital coherent optical receiver in the second embodiment.

The configuration and operation of the I-Q phase error compensation circuit illustrated in FIG. 8 is basically the same as the configuration illustrated in FIG. 7. However, in the configuration illustrated in FIG. 8, since $I_1^2+Q_1^2$ is given from the amplitude monitor unit 71, the adder 43 is not provided. Then, the subtractor 44 subtracts $I_1^2+Q_1^2$ given from the amplitude monitor unit 71 from the output signal of the squaring circuit 42.

According to this configuration, the I-Q phase error compensation circuit 40 does not need to include respective circuits for squaring signals $I_2$ and $Q_2$. Therefore, the circuit scale of the I-Q phase error compensation circuit 40 may be reduced.

Third Embodiment

Figure 9:
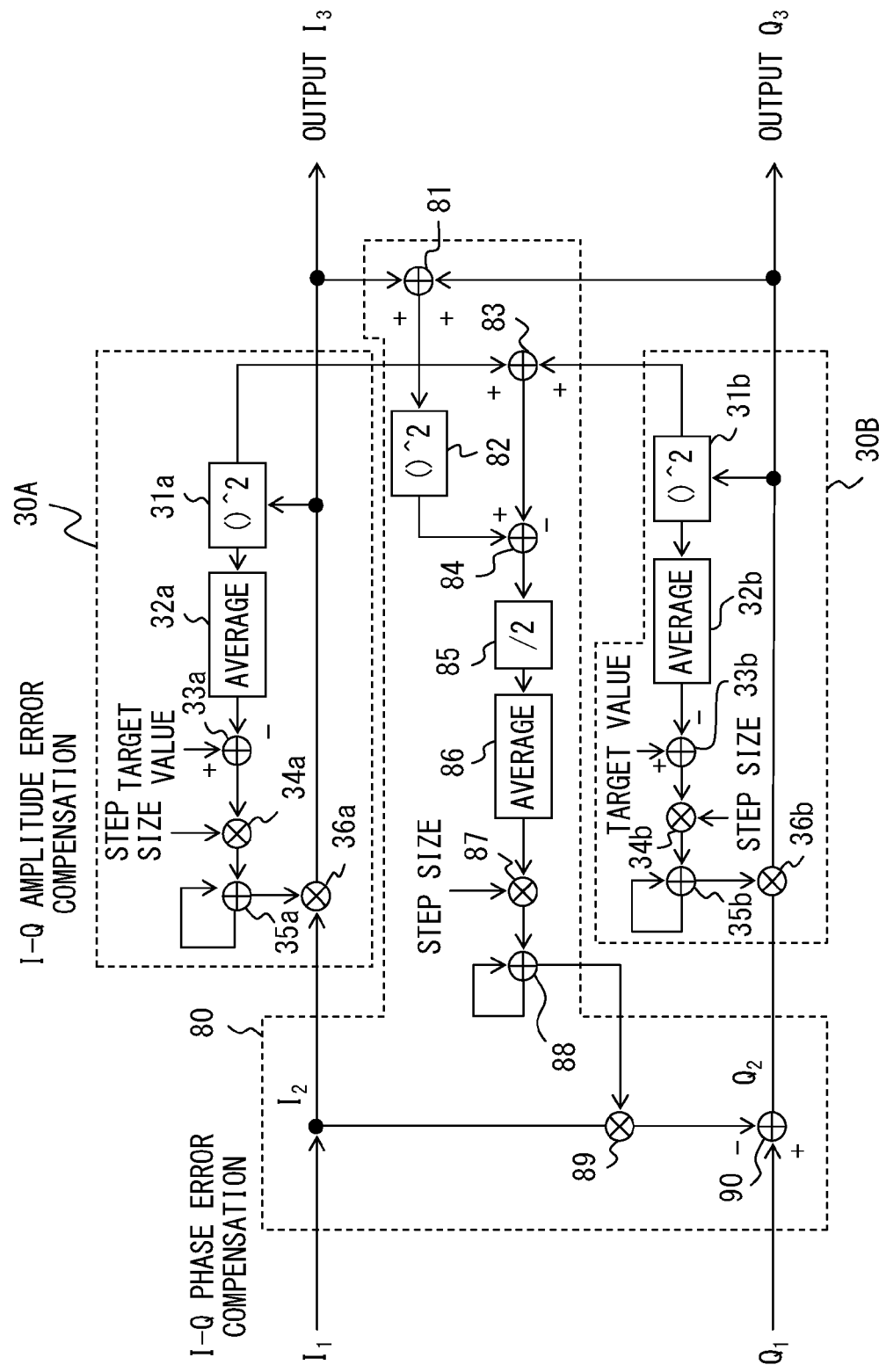
FIG. 9 illustrates a configuration of the digital coherent optical receiver in the third embodiment.

FIG. 9 illustrates a configuration of the digital coherent optical receiver in the third embodiment. The digital coherent optical receiver in the third embodiment includes I-Q amplitude error compensation circuits 30A and 30B and I-Q phase error compensation circuit 80. In the third embodiment, the I-Q phase error compensation circuit 80 compensates for I-Q phase error by a feedback method. In the third embodiment, the following real and imaginary part signals $I_1$ and $Q_1$ are input to the digital coherent optical receiver for each symbol.

$I_1 = I_0$ $Q_1 = \alpha(I_0 \sin \theta + Q_0 \cos \theta)$

Signals $I_2$ and $Q_2$ are input signals to the I-Q amplitude error compensation circuits 30A and 30B, respectively. However, $I_1=I_2$. The signal $Q_2$ is the output signal of the subtractor 90. Signals $I_3$ and $Q_3$ are the output signals of the digital coherent optical receiver and real and imaginary part signals whose phase error and amplitude error are compensated for.

In this embodiment, the I-Q phase error compensation circuit 80 includes an adder 81, a squaring circuit 82, an adder 83, a subtractor 84, a divider 85, an averaging circuit 86, a multiplier 87, an accumulation adder 88, a multiplier 89, and a subtractor 90.

The configurations and operations of the adder 81, the squaring circuit 82, the adder 83, the subtractor 84, the divider 85 and the averaging circuit 86 are similar to the adder 41, the squaring circuit 42, the adder 43, the subtractor 44, the divider 45, and the averaging circuit 46 in the second embodiment. However, $I_3$, $Q_3$, $I_3^2$ and $Q_3^2$ are given to the I-Q phase error compensation circuit 80. Therefore, the output signal of the averaging circuit 86 is $\Sigma(I_3Q_3)/N$. As described above, $I_3$ and $Q_3$ are the output signals of this digital coherent optical receiver. In this embodiment, $I_3^2$ and $Q_3^2$ are calculated by the I-Q amplitude error compensation circuits 30A and 30B, respectively.

The multiplier 87 multiplies the output signal of the averaging circuit 86 (that is, $\Sigma(I_3Q_3)/N$) by a specified constant. This constant is a step size for determining the response speed of a control loop and is a sufficiently small value. The accumulation adder 88 calculates the accumulation value of the calculation results of the multiplier 87. In other words, the accumulation adder 88 operates as an integrator.

The multiplier 89 multiplies the real part signal $I_1$ by the calculation result of the accumulation adder 88. Then, the subtractor 90 generates the signal $Q_2$ by subtracting the output signal of the multiplier 89 from the imaginary part signal $Q_1$.

The above feedback system operates in such away that the output signal of the averaging circuit 86 (that is, $\Sigma(I_3Q_3)/N$) may converge on zero. If so, the output signal of the accumulation adder 88 converges on $\alpha \sin \theta$. In this case, the output signal of the multiplier 89 is $\alpha I_1 \sin \theta$ and the output signal of the subtractor 90 (that is, signal $Q_2$) is $Q_1 - \alpha I_1 \sin \theta$. Therefore, the signal $Q_2$ is expressed by the following expression (11).

$$Q_2 = Q_1 - \alpha I_1 \sin\theta \quad (11)$$
$$= \alpha(I_0\sin\theta + Q_0\cos\theta) - \alpha I_1 \sin\theta$$
$$= \alpha Q_0 \cos\theta$$

When expressing the signals $I_2$ and $Q_2$ in a matrix form, expression (12) is obtained.

$$\begin{bmatrix} I_2 \\ Q_2 \end{bmatrix} = \begin{bmatrix} 1 & 0 \\ -\alpha\sin(\theta) & 1 \end{bmatrix} \begin{bmatrix} 1 & 0 \\ \alpha\sin(\theta) & \alpha\cos(\theta) \end{bmatrix} \begin{bmatrix} I_0 \\ Q_0 \end{bmatrix} \quad (12)$$
$$= \begin{bmatrix} 1 & 0 \\ 0 & \alpha\cos(\theta) \end{bmatrix} \begin{bmatrix} I_0 \\ Q_0 \end{bmatrix}$$

Thus, the signals $I_2$ and $Q_2$ obtained by the I-Q phase error compensation circuit 80 is expressed by the following expression.

$$I_2 = I_0$$

$$Q_2 = \alpha Q_0 \cos\theta$$

In this case, the signal $I_2$ does not include $Q_0$ component. Similarly, the signal $Q_2$ does not include $I_0$ component. Therefore, neither of the signals $I_2$ and $Q_2$ includes any crosstalk component. However, in this stage, the amplitude error $\alpha$ remains.

The configurations of the I-Q amplitude error compensation circuits 30A and 30B are similar to that of the amplitude error compensation circuit 30 illustrated in FIG. 5. Specifically, the I-Q amplitude error compensation circuit 30A operates in such a way that $\Sigma I_3^2/N$ may coincide with the "target value". The I-Q amplitude error compensation circuit 30B operates in such a way that $\Sigma Q_3^2/N$ may coincide with the same "target value". Therefore, the calculation representing the operation of the I-Q amplitude error compensation circuits 30A and 30B may be expressed by the expression (13).

$$a \begin{bmatrix} 1 & 0 \\ 0 & 1/(\alpha\cos(\theta)) \end{bmatrix} \quad (13)$$

In this case, signals $I_2$ and $Q_2$ are given to the I-Q amplitude error compensation circuits 30A and 30B, respectively. Therefore, the signals $I_3$ and $Q_3$ are obtained by applying the above expression (13) to the signals $I_2$ and $Q_2$ expressed by the above expression (12). Specifically, the signals $I_3$ and $Q_3$ are calculated by the following expression (14).

$$\begin{bmatrix} I_3 \\ Q_3 \end{bmatrix} = a \begin{bmatrix} 1 & 0 \\ 0 & 1/(\alpha\cos(\theta)) \end{bmatrix} \begin{bmatrix} 1 & 0 \\ 0 & \alpha\cos(\theta) \end{bmatrix} \begin{bmatrix} I \\ Q \end{bmatrix} = a \begin{bmatrix} I_0 \\ Q_0 \end{bmatrix} \quad (14)$$

Therefore, the signals $I_3$ and $Q_3$ obtained by this digital coherent optical receiver are expressed by the following expression.

$$I_3 = aI_0$$

$$Q_3 = aQ_0$$

Thus, neither of the signals $I_3$ and $Q_3$ includes crosstalk component. "a" is common to the signals $I_3$ and $Q_3$. Therefore, the original real and imaginary part components $I_0$ and $Q_0$ of an optical signal are obtained based on the signals $I_3$ and $Q_3$. In other words, as in the first or second embodiment, in the digital coherent optical receiver in the third embodiment, the phase error of the 90-degree optical hybrid circuit is compensated for and the original real and imaginary part components $I_0$ and $Q_0$ of the optical signal are obtained. Therefore, the modulation performance is improved.

Since phase error are compensated for by feedback control in the third embodiment, the operation of the I-Q phase error compensation circuit 80 does not depend on the target value used in the I-Q amplitude error compensation circuits 30A and 30B. Therefore, in the third embodiment, no divider is needed between the averaging circuit 86 and the multiplier 87. In addition, in the third embodiment, as in the first or second embodiment, the I-Q amplitude error compensation circuits 30A and 30B may compensate for amplitude error using the absolute value of the signals $I_3$ and $Q_3$. Furthermore, as in the first or second embodiment, in the third embodiment, the I-Q amplitude error compensation circuits 30A and 30B may compensate for amplitude error by feed-forward control. In addition, the circuit scale is reduced by the configuration of the third embodiment.

Alternatively, $I_1^2$ and $Q_1^2$ may be individually subtracted from $(I_2+Q_2)^2$ without providing the adder 83 in the I-Q phase error compensation circuit 80 in the third embodiment. Furthermore, in the embodiment illustrated in FIG. 9, the I-Q phase error compensation circuit 80 compensates for a phase error before the I-Q amplitude error compensation circuits 30A and 30B compensate for amplitude imbalance. However, the amplitude error may be compensated for before the I-Q phase error compensation circuit 80 compensates for the phase error.

Variation 1 of Third Embodiment

Figure 10:
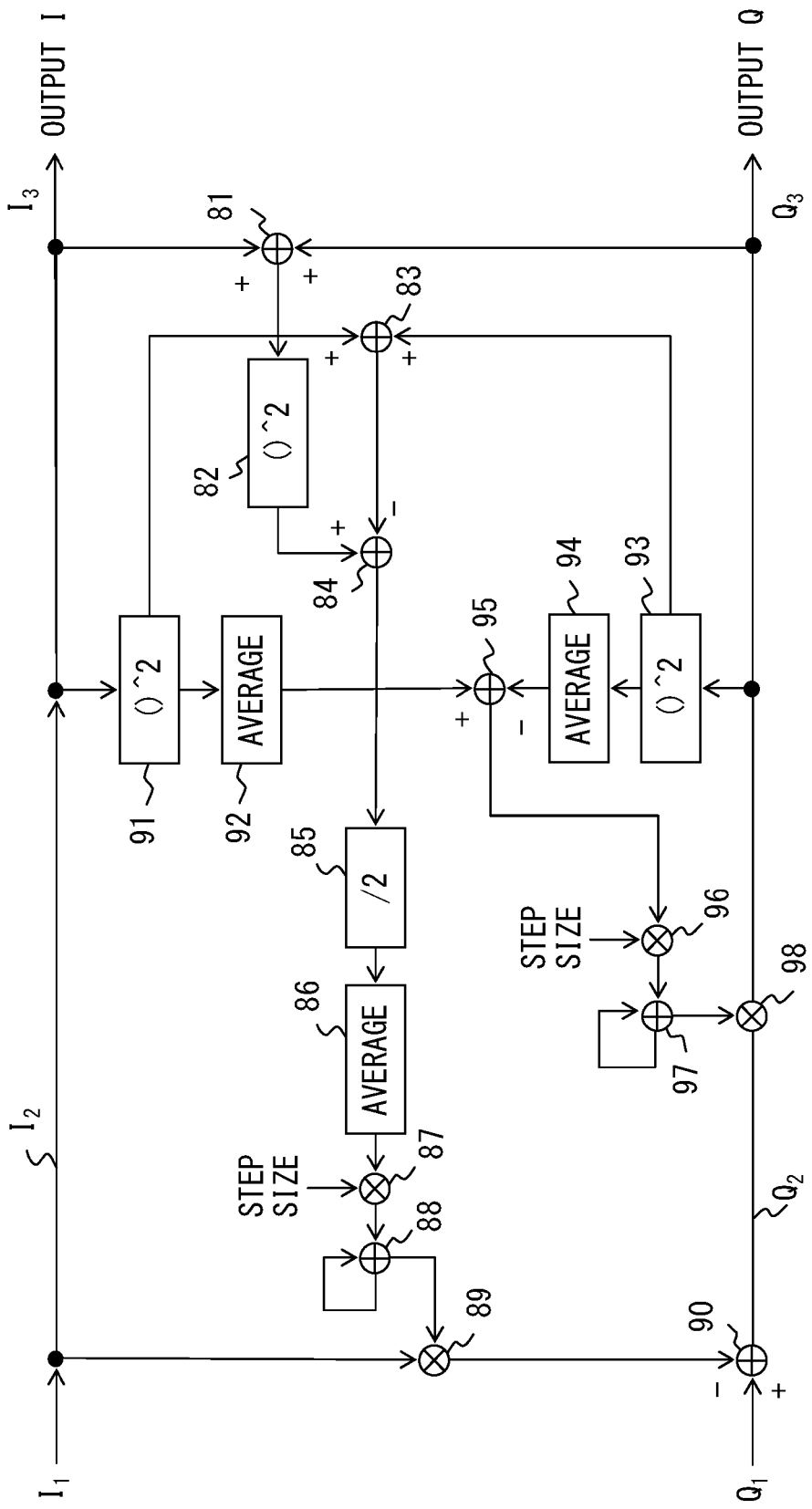
FIG. 10 illustrates a variation (configuration without normalization) of the digital coherent optical receiver in the third embodiment.

FIG. 10 illustrates a variation (configuration without normalization) of the digital coherent optical receiver in the third embodiment. In this configuration, the I-Q amplitude error compensation circuit does not perform normalization. In this case, the I-Q amplitude error compensation circuit includes a squaring circuit 91, an averaging circuit 92, a squaring circuit 93, an averaging circuit 94, a subtractor 95, a multiplier 96, an accumulation adder 97 and a multiplier 98. In this configuration, the signal $I_1$ is output without being changed.

The squaring circuit 91 squares a signal $I_3$. The averaging circuit 92 calculates the average of the output signal of the squaring circuit 91. Similarly, the squaring circuit 93 squares a signal $Q_3$ and the averaging circuit 94 calculates the average of the output signal of the squaring circuit 93. Then, the subtractor 95 calculates a difference between the output signal of the averaging circuit 92 and the output signal of the averaging circuit 94.

The multiplier 96 multiplies the difference obtained by the subtractor 95 by the step size. The accumulation adder 97 calculates an accumulation value of the output signal from the multiplier 96. The multiplier 98 multiplies the signal $Q_2$ by the output signal of the accumulation adder 97.

The feedback system operates in such a way that the difference obtained by the subtractor 95 may converge on zero. Thus, the signal $Q_2$ is corrected and the signal $Q_3$ is generated.

The circuit for compensating for phase error is a feedback system and has the similar configuration as illustrated in FIG. 9. However, in the configuration illustrated in FIG. 10, a phase error is compensated for using $I_3{}^2$ and $Q_3{}^2$ calculated by the squaring circuits 91 and 93, respectively.

In this configuration, although the amplitude of real and imaginary part signals are not normalized, the imbalance of the real and imaginary part signals is compensated for. Therefore, in a receiver for demodulating optical signals according to a ratio between the real and imaginary part signals I and Q, even this configuration precisely recovers transmission data.

Variation 2 of Third Embodiment

Figure 11:
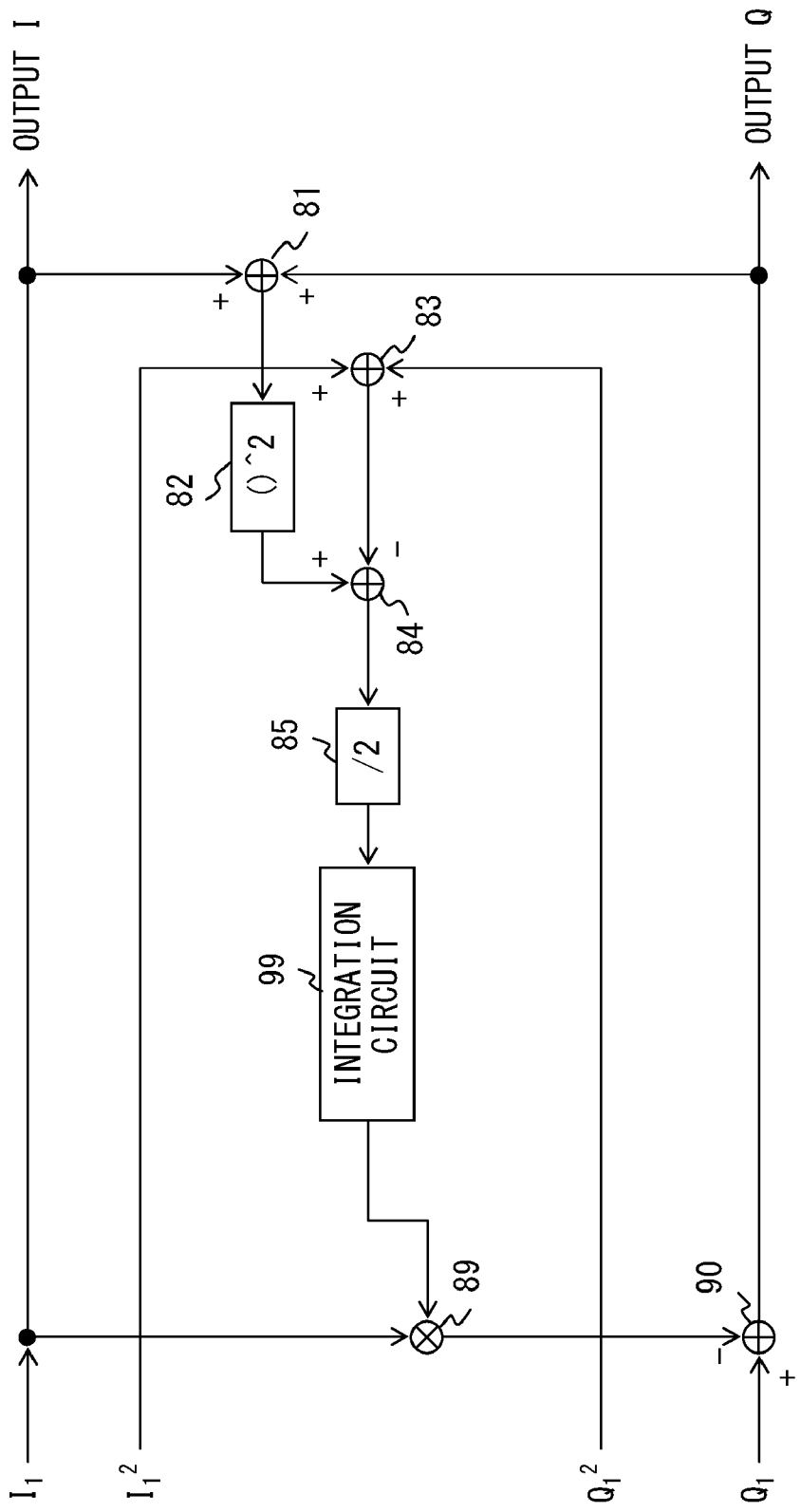
FIG. 11 illustrates a variation (configuration without an amplitude error compensation circuit) of the digital coherent optical receiver in the third embodiment.

The digital coherent optical receiver in the third embodiment, as in the first or second embodiment, does not need an I-Q amplitude error compensation circuit. In this case, $I_1$, $Q_1$, $I_1{}^2$ and $Q_1{}^2$ are input to the I-Q amplitude error compensation circuit for each symbol. An integration circuit 99 illustrated in FIG. 11 has functions corresponding to the averaging circuit 86, the multiplier 87, and the accumulation adder 88.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions has(have) been described in detail, it should be understood that the various changes, substitutions, and alterations could be made hereto without departing from the spirit and scope of the invention.

What is claimed is:

1. A digital coherent optical receiver provided with a 90-degree optical hybrid circuit for detecting an in-phase signal and a quadrature signal of an input optical signal, comprising:
    a first circuit to calculate a square of a sum of the in-phase signal and the quadrature signal;
    a second circuit to subtract a squared value of the in-phase signal and a squared value of the quadrature signal from the calculation result of the first circuit;
    a third circuit to detect a phase error of the 90-degree optical hybrid circuit based on the calculation result of the second circuit; and
    a fourth circuit to correct at least one of the in-phase signal and the quadrature signal according to the phase error detected by the third circuit.

2. The digital coherent optical receiver according to claim 1, wherein the phase error of the 90-degree optical hybrid circuit is expressed by $\theta$, and wherein
    the third circuit calculates $\sin \theta$ based on the calculation result of the second circuit, and
    the fourth circuit comprises
        a fifth circuit to calculate $\cos \theta$ from the $\sin \theta$;
        a sixth circuit to correct the in-phase signal using the $\cos \theta$; and
        a seventh circuit to correct the quadrature signal using a product of the in-phase signal and the $\sin \theta$.

3. The digital coherent optical receiver according to claim 1, further comprising
    an addition circuit to calculate a sum of a squared value of the in-phase signal and a squared value of the quadrature signal, wherein
    the second circuit subtracts the calculation result of the addition circuit from the calculation result of the first circuit.

4. A digital coherent optical receiver provided with a 90-degree optical hybrid circuit for detecting an in-phase signal and a quadrature signal of an input optical signal, comprising:
    an amplitude error compensation circuit to generate a second in-phase signal by correcting the in-phase signal in such a way that amplitude information about the in-phase signal coincides with a target value and generate a second quadrature signal by correcting the quadrature signal in such a way that amplitude information about the quadrature signal coincides with the target value;
    a first circuit to calculate a square of a sum of the second in-phase signal and the second quadrature signal;
    a second circuit to subtract a squared value of the second in-phase signal and a squared value of the second quadrature signal from the calculation result of the first circuit;
    a third circuit to detect a phase error of the 90-degree optical hybrid circuit based on the calculation result of the second circuit; and
    a fourth circuit to correct at least one of the second in-phase signal and the second quadrature signal according to the phase error detected by the third circuit.

5. The digital coherent optical receiver according to claim 4, wherein the phase error of the 90-degree optical hybrid circuit is expressed by $\theta$, and wherein
    the third circuit calculates $\sin \theta$ based on the calculation result of the second circuit, and
    the fourth circuit comprises
        a fifth circuit to calculate $\cos \theta$ from the $\sin \theta$;
        a sixth circuit to correct the second in-phase signal using the $\cos \theta$; and a seventh circuit to correct the second quadrature signal using a product of the second in-phase signal and the sin θ.

6. The digital coherent optical receiver according to claim 4, wherein the target value is $2^N$ where N is a integer, the amplitude error compensation circuit corrects the in-phase signal and the quadrature signal in such a way that each of an average of a square of the in-phase signal and an average of a square of the quadrature signal coincides with the target value, and the third circuit comprises a first divider to divide the calculation result of the second circuit by 2;

an averaging circuit to average an output signal of the first divider; and a second divider to detect the phase error by dividing the output signal of the averaging circuit by the target value.

7. The digital coherent optical receiver according to claim 6, wherein each of the first and second dividers is a bit shift circuit.

8. The digital coherent optical receiver according to claim 4, wherein the target value is 1, the amplitude error compensation circuit corrects the in-phase signal and the quadrature signal in such a way that each of an average of a square of the in-phase signal and an average of a square of the quadrature signal coincides with the target value, and the third circuit comprises a divider to divide the calculation result of the second circuit by 2; and an averaging circuit to detect the phase error by averaging the output signal of the divider.

9. The digital coherent optical receiver according to claim 8, wherein the divider is a bit shift circuit.

10. A digital coherent optical receiver provided with a 90-degree optical hybrid circuit for detecting an in-phase signal and a quadrature signal of an input optical signal, comprising:

a phase error compensation circuit to generate a first signal and a second signal, which represent the in-phase signal and the quadrature signal whose phase error of the 90-degree optical hybrid circuit is compensated for, according to the in-phase signal and the quadrature signal, wherein the phase error compensation circuit comprises a first calculation circuit to calculate a square of a sum of the first signal and the second signal;

a second circuit to subtract a squared value of the first signal and a squared value of the second signal from the calculation result of the first circuit;

a third circuit to detect the phase error of the 90-degree optical hybrid circuit based on the calculation result of the second circuit; and a fourth circuit to generate the first signal and the second signal by correcting at least one of the in-phase signal and the quadrature signal according to the phase error detected by the third circuit.

\* \* \* \* \*